(12) United States Patent
Azuma

(10) Patent No.: US 11,739,501 B2
(45) Date of Patent: Aug. 29, 2023

(54) WORKING VEHICLE

(71) Applicant: KUBOTA CORPORATION, Osaka (JP)

(72) Inventor: Hitoshi Azuma, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 297 days.

(21) Appl. No.: 17/341,472

(22) Filed: Jun. 8, 2021

(65) Prior Publication Data
US 2021/0404147 A1 Dec. 30, 2021

(30) Foreign Application Priority Data
Jun. 29, 2020 (JP) ................. 2020-111892

(51) Int. Cl.
*E02F 9/20* (2006.01)
*E02F 9/22* (2006.01)

(52) U.S. Cl.
CPC .......... *E02F 9/2083* (2013.01); *E02F 9/2062* (2013.01); *E02F 9/2079* (2013.01); *E02F 9/2253* (2013.01)

(58) Field of Classification Search
CPC ..... E02F 9/2083; E02F 9/2062; E02F 9/2079; E02F 9/2253; B60W 2540/12; B60W 2710/021; B60W 2710/022; B60W 10/02; B60W 10/18
See application file for complete search history.

(56) References Cited

U.S. PATENT DOCUMENTS

| 5,048,655 | A | 9/1991 | Seeba |
| 2007/0099757 | A1 | 5/2007 | Landes |
| 2016/0236676 | A1* | 8/2016 | Arai ............... B60W 20/40 |
| 2017/0320497 | A1* | 11/2017 | Khafagy ......... B60W 30/18072 |

FOREIGN PATENT DOCUMENTS

| EP | 0 205 322 A2 | 12/1986 |
| EP | 0 375 162 A2 | 6/1990 |
| JP | 61-55413 A | 3/1986 |

OTHER PUBLICATIONS

Official Communication issued in corresponding Japanese Patent Application No. 2020-111892, dated Apr. 4, 2023.

\* cited by examiner

*Primary Examiner* — James M McPherson
*Assistant Examiner* — Kyle J Kingsland
(74) *Attorney, Agent, or Firm* — KEATING AND BENNETT, LLP

(57) ABSTRACT

A working vehicle includes a prime mover, a traveling device, a traveling clutch switchable between an engaged state to transmit, to the traveling device, power provided from the prime mover and a disengaged state to interrupt the power transmitting to the traveling device, an automatic switching controller to switch the traveling clutch from the disengaged state to the engaged state, and a status detector to detect at least either a status of the prime mover or a status of the traveling device. The automatic switching controller changes a switching speed of the traveling clutch switched from the disengaged state to the engaged state based on the status detected by the status detector.

19 Claims, 5 Drawing Sheets

WORKING VEHICLE

CROSS REFERENCE TO RELATED APPLICATIONS

This application claims the benefit of priority to Japanese Patent Application No. 2020-111892 filed on Jun. 29, 2020. The entire contents of this application are hereby incorporated herein by reference.

BACKGROUND OF THE INVENTION

1. Field of the Invention

The present invention relates to a working vehicle, for example.

2. Description of the Related Art

U.S. Pat. No. 5,048,655 is known as a technology to disengage a clutch for transmitting power to a traveling device of a vehicle according to operation of braking the traveling device, i.e., depressing a brake pedal. In a construction vehicle of U.S. Pat. No. 5,048,655, a clutch configured to transmit power to a crawler is engaged by releasing the brake, i.e., returning the brake pedal.

SUMMARY OF THE INVENTION

A working vehicle according to a preferred embodiment of the present invention includes a prime mover, a traveling device, a traveling clutch switchable between an engaged state to transmit, to a traveling device, power provided from the prime mover and a disengaged state to interrupt the power transmitting to the traveling device, an automatic switching controller to switch the traveling clutch from the disengaged state to the engaged state, and a status detector to detect at least either a status of the prime mover or a status of the traveling device. The automatic switching controller is configured or programmed to change a switching speed of the traveling clutch switched from the disengaged state to the engaged state based on the status detected by the status detector.

A working vehicle according to a preferred embodiment of the present invention includes a brake to apply a braking action to the traveling device in response to an operation of a braking operator, a braking controller to execute the braking action with the brake in response to the operation of the braking operator, and a selector operable to select whether or not to allow the braking controller to execute the braking action with the brake. When the selector is operated to determine not to allow the braking controller to execute the braking action, the automatic switching controller switches the traveling clutch between the disengaged state and the engaged state in response to the operation of the braking operator.

The automatic switching controller switches the traveling clutch from the engaged state to the disengaged state when an operation extent of the braking operator is increased and becomes a first threshold or more, and switches the traveling clutch from the disengaged state to the engaged state when the operation extent of the braking operator is reduced and becomes less than the first threshold.

The status detector is configured or programmed to detect whether or not the traveling device moves in a certain direction. The automatic switching controller changes the switching speed in correspondence to the movement of the traveling device in the certain direction detected when the operation extent of the braking operator is reduced and becomes less than the first threshold.

The status detector is configured or programmed to detect backward movement of the traveling device defined as the movement of the traveling device in the certain direction. When the operation extent of the braking operator is reduced and becomes less than the first threshold and the backward movement of the traveling device is detected, the automatic switching controller reduces the switching speed to a speed less than the switching speed set when the operation extent of the braking operator is reduced and becomes less than the first threshold and the backward movement of the traveling device is not detected.

The status detector is configured or programmed to detect a load on the prime mover. The automatic switching controller changes the switching speed in correspondence to the load detected when the operation extent of the braking operator is reduced and becomes less than the first threshold.

When the operation extent of the braking operator is reduced and becomes less than the first threshold and the load is not less than a second threshold, the automatic switching controller reduces the switching speed to a speed less than the switching speed set when the operation extent of the braking operator is reduced and becomes less than the first threshold and the load is less than the second threshold.

The working vehicle includes a setting controller to set a distance or time allowable for backward movement of the traveling device. When an actual distance or time of backward movement of the traveling device exceeds the set allowable distance or time, the automatic switching controller stops the reduction of the switching speed.

The working vehicle includes a forward traveling switching valve fluidly connected to a clutch switch including a hydraulic clutch and operable by a solenoid to switch the clutch switch into a state to allow forward traveling of the traveling device, and a backward traveling switching valve fluidly connected to the clutch switch operable by another solenoid to switch the clutch switch into a state to allow backward traveling of the traveling device. When the operation extent of the braking operator is reduced and becomes less than the first threshold, the automatic switching controller increases an electric current value of a control signal output to the solenoid of the forward traveling switching valve, then reduces the electric current value, and then increases the electric current value again.

When the operation extent of the braking operator is reduced and becomes less than the first threshold and the status detector does not detect backward movement of the traveling device, the automatic switching controller outputs a control signal with an electric current value to set the switching speed to a predetermined speed. When the operation extent of the braking operator is reduced and becomes less than the first threshold and the status detector detects backward movement of the traveling device, the automatic switching controller outputs a control signal with an electric current value to reduce the switching speed to a speed less than the predetermined speed.

The automatic switching controller refers to the movement direction of the traveling device when the operation extent of the braking operator is reduced and becomes less than the first threshold.

The automatic switching controller, which has outputted the control signal with the electric current value corresponding to the reduced switching speed to the forward traveling switching valve because the operation extent of the braking operator becomes less than the first threshold and the traveling device moves backward, steeply increases the electric current value of the control signal to stop the reduction of the switching speed when a distance of the backward movement of the traveling device reaches the set allowable distance.

The automatic switching controller, which has outputted the control signal with the electric current value corresponding to the reduced switching speed to the forward traveling switching valve because the operation extent of the braking operator is reduced and becomes less than the first threshold and the traveling device moves backward, steeply increases the electric current value of the control signal to stop the reduction of the switching speed when a time of the backward movement of the traveling device reaches the set allowable time.

When the operation extent of the braking operator is reduced and becomes less than the first threshold and the load detected by the status detector is less than the second threshold, the automatic switching controller outputs electric current with a value to set the switching speed to a predetermined speed. When the operation extent of the braking operator is reduced and becomes less than the first threshold and the load detected by the status detector is not less than the second threshold, the automatic switching controller outputs electric current with another value to reduce the switching speed to a speed less than the predetermined speed.

According to preferred embodiments of the present invention, engine stalling can be efficiently prevented in engaging a traveling clutch to transmit power of a prime mover to a traveling device.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
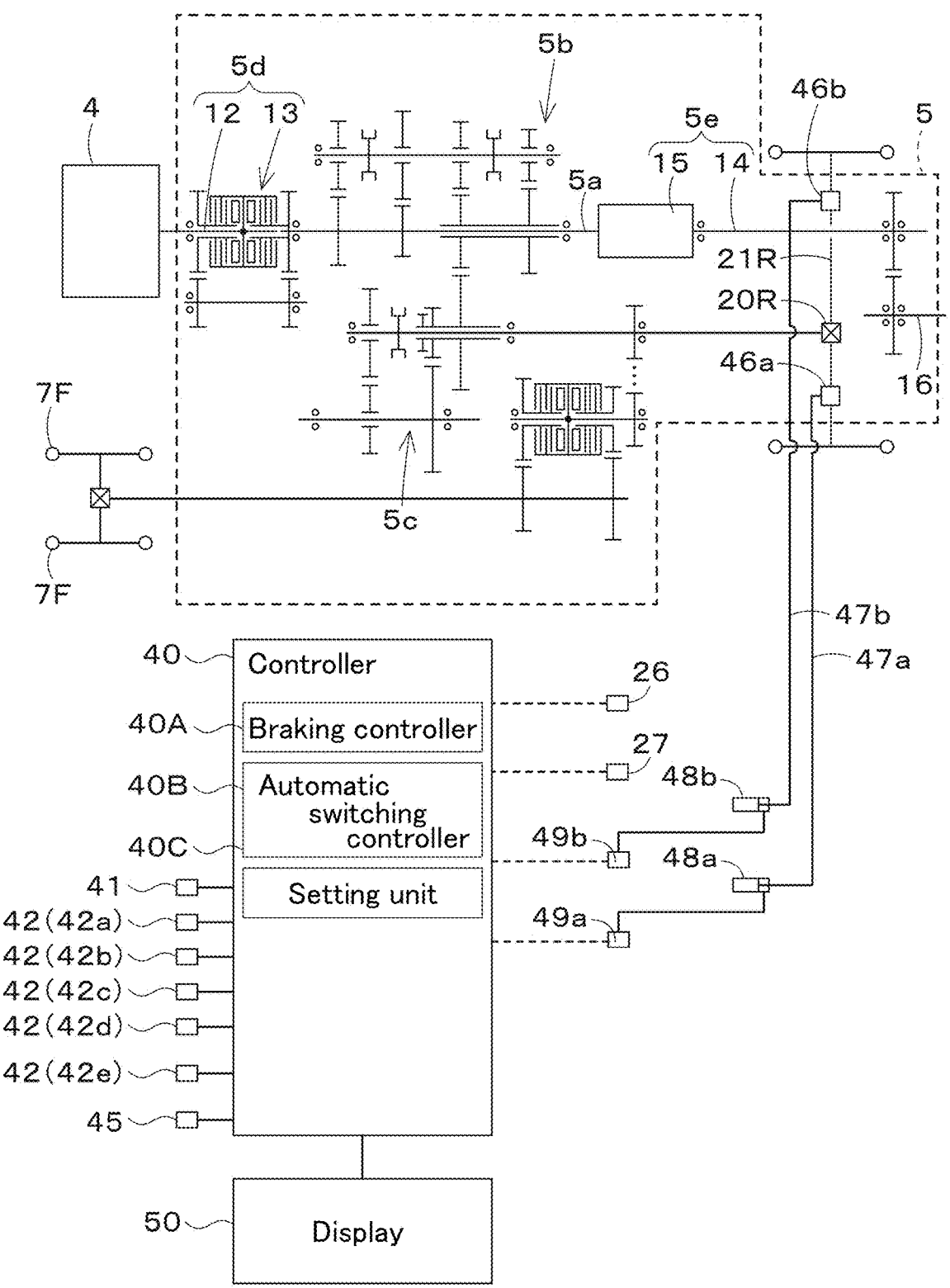
FIG. 1 is a view illustrating a configuration of a tractor and a control block diagram.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with appropriate reference to the drawings.

Figure 5:
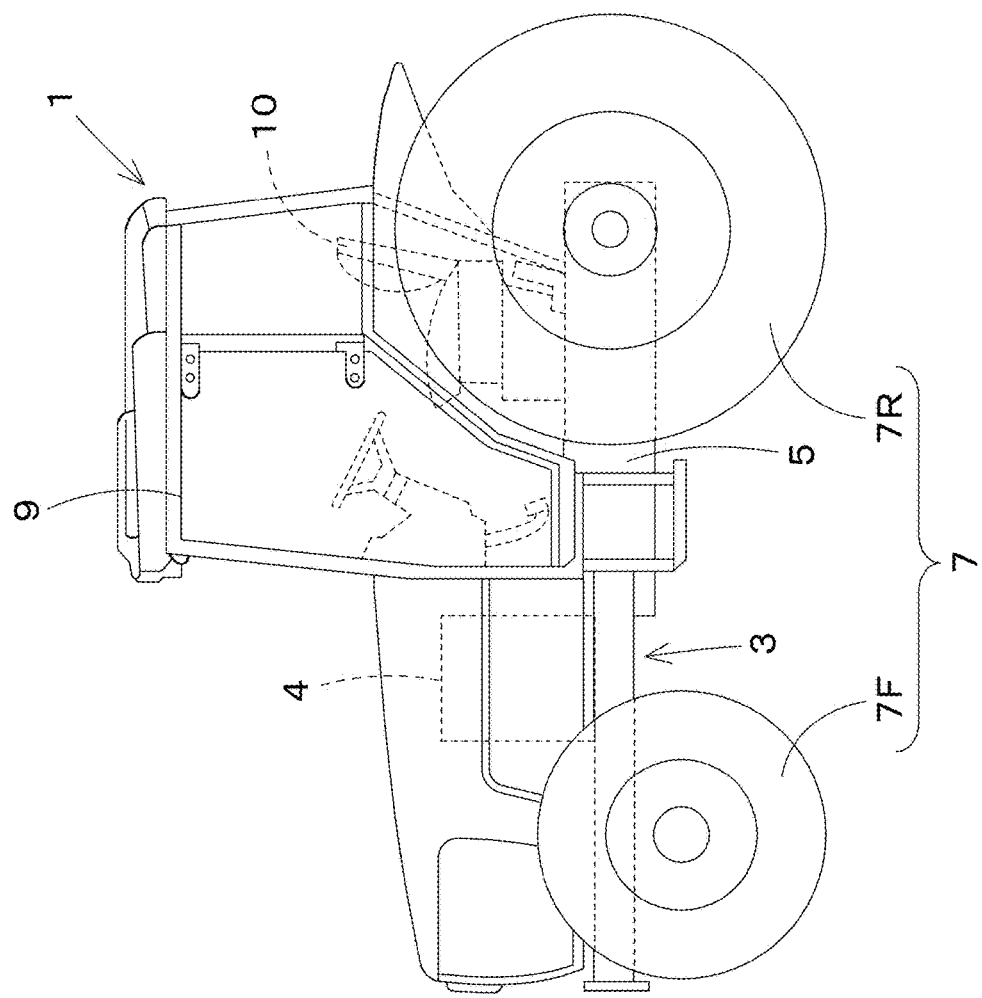
FIG. 5 is a view of the entire tractor.

FIG. 5 is a side view showing a working vehicle 1 according to a preferred embodiment of the present invention. In the present preferred embodiment, the working vehicle 1 is a tractor. However, the working vehicle 1 is not limited to a tractor, but may also be any agricultural machine (or any agricultural vehicle) such as a combine or a transplanter, or any construction machine (or any construction vehicle) such as a loader working machine.

In the following description, a term "front" or "forward" corresponds to a forward direction of a driver sitting on a driver seat 10 of the tractor (that is, the working vehicle) 1, a term "rear" or "rearward" corresponds to a rearward direction of the driver, a term "left" or "leftward" corresponds to a left direction of the driver, and a term "right" or "rightward" corresponds to a right direction of the driver. In addition, a horizontal direction orthogonal to a fore-and-aft direction of the working vehicle 1 is referred to as a vehicle width direction.

As shown in FIG. 5, the tractor 1 includes a vehicle body 3, a prime mover 4, and a variable speed transmission 5. The vehicle body 3 is provided with a traveling device 7, thereby being capable of traveling. The traveling device 7 includes front wheels 7F and rear wheels 7R. The front wheels 7F may be either tires or crawlers. The rear wheels 7R may also be either tires or crawlers.

The prime mover 4 may be a diesel engine, an electric motor, or the like. In this preferred embodiment, the prime mover 4 preferably is a diesel engine. The variable speed transmission 5 includes multi-speed gear trains any one of which is selected to transmit a force to propel the traveling device 7, and is also configured to switch a traveling direction of the traveling device 7 between forward and backward. The driver seat 10 is located on the vehicle body 3.

An unillustrated coupling is located on a rear portion of the vehicle body 3. A working device can be attached to and detached from the coupling. By attaching the working device to the coupling, the working device can be towed by the vehicle body 3. Various working devices attachable to the coupling include a cultivator, a fertilizer sprayer, a pesticide sprayer, a harvester, a mower device for mowing grass and the like, a tedder for spreading grass and the like, a raking device for collecting grass and the like, and a baler for molding grass and the like.

Figure 2:
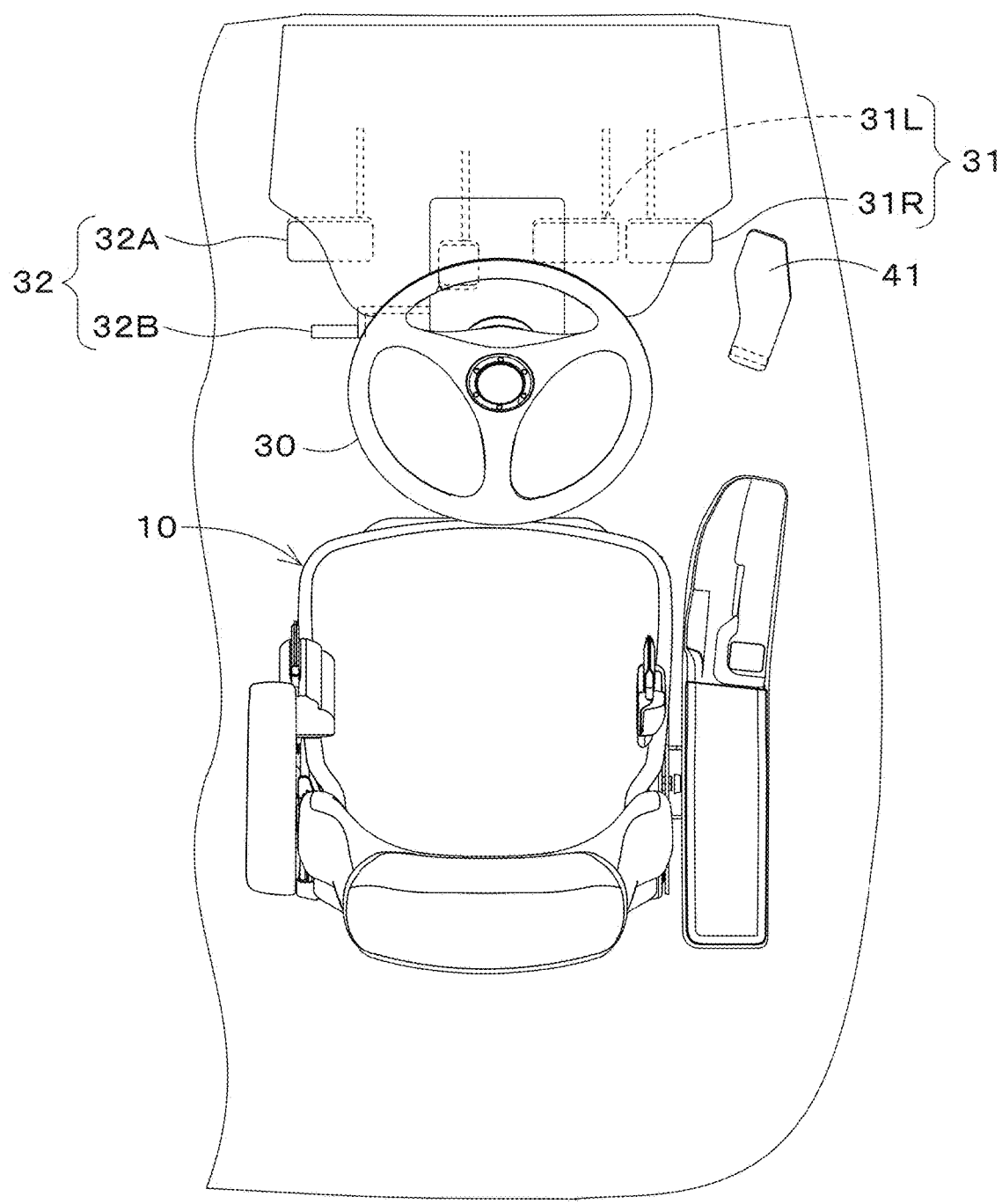
FIG. 2 is a view illustrating a periphery of a driver seat.

As shown in FIG. 2, a steering wheel 30 to steer the vehicle body 3, a braking operation member 31, and a clutch switching member 32 are located around the driver seat 10. The braking operation member 31 includes a plurality of operating portions, for example, a brake pedal 31L located leftward and a brake pedal 31R located rightward. Each of the brake pedal 31L and the brake pedal 31R is pivotally supported by the vehicle body 3, and is operable by depression with a foot of a driver sitting on the driver seat 10.

The clutch switching member 32 includes a clutch pedal 32A and a clutch lever 32B. The clutch pedal 32A is pivotally supported by the vehicle body 3, and is operable by the driver sitting on the driver seat 10 in the same manner as the brake pedal 31L and brake pedal 31R. The clutch lever 32B is pivotally supported near the steering wheel 30, for example, and is capable of being switched between a forward-traveling position (F), a backward-traveling position (R), and a neutral position (N). The tractor (or the working vehicle) 1 can travel forward by setting the clutch lever 32B at the forward-traveling position (F) and operating an accelerator 41 shown in FIG. 1, such as an acceleration pedal or an acceleration lever. The tractor (or the working vehicle) 1 can also travel backward by setting the clutch lever 32B at the backward-traveling position (R) and operating the accelerator 41. When the clutch lever 32B is set at the neutral position (N), the tractor (that is, the working vehicle) 1 will neither travel forward nor backward with a driving force of the prime mover 4 even when the accelerator 41 is operated.

As shown in FIG. 1, the variable speed transmission 5 includes a main shaft (or a propulsion shaft) 5a, a main speed-shifting device 5b, a sub speed-shifting device 5c, a traveling clutch 5d, and a PTO power transmission device 5e. The propulsion shaft 5a is rotatably supported on a casing (or a transmission case) of the variable speed transmission 5 to receive a power from an output shaft (such as a crankshaft) of the prime mover 4. The main speed-shifting device 5b includes a plurality of main speed gear trains and a shifter to select one of the main speed gear trains to drivingly connect the propulsion shaft 5a to its output portion. The main speed-shifting device 5b selects one of the main speed gear trains by use of the shifter so as to transmit the rotational power input from the propulsion shaft 5a to its output portion via the selected main speed gear train.

The sub speed-shifting device 5c includes a plurality of sub speed gear trains and a shifter to select one of the sub speed gear trains to drivingly connect the output portion of the main speed-shifting device 5b to its output portion. The sub speed-shifting device 5c selects one of the sub speed gear trains by use of the shifter so as to transmit the rotational power input from the main speed-shifting device 5b to its output portion via the selected sub speed gear train.

The traveling clutch 5d is configured to be switched between an engaged state in which the power is transmitted to the traveling device 7 (that is, the front wheels 7F and the rear wheels 7R) and a disengaged state in which transmission of the power to the traveling device 7 is cut off. The traveling clutch 5d includes a shuttle shaft 12 and a clutch switching unit 13. The shuttle shaft 12 is drivingly connected to the prime mover 4 so as to receive a power output from the prime mover 4. The clutch switching unit 13 includes a hydraulic clutch configured to be switched between a forward-traveling position, a backward-traveling position, and a neutral position.

The clutch switching unit 13 is fluidly connected to a forward traveling switching valve 26 and a backward traveling switching valve 27 via fluid lines (not shown in the drawings) or the like. The forward traveling switching valve 26 and the backward traveling switching valve 27 are, for example, including two-position solenoid switching valves. When a solenoid of the forward traveling switching valve 26 is excited, the clutch switching unit 13 is switched to the forward-traveling position, and when the solenoid of the backward traveling switching valve 27 is excited, the clutch switching unit 13 is switched to the backward-traveling position. When both the solenoids of the forward-traveling switching valve 26 and the backward-traveling switching valve 27 are unexcited, the clutch switching unit 13 is set at the neutral position.

As shown in FIG. 1, the clutch switching unit 13 is configured to be switched by the clutch switching member 32 and a controller 40. When the clutch lever 32B is set at the forward-traveling position (F), the controller 40, outputs a control signal, e.g., electric current, so as to excite a solenoid of the forward traveling switching valve 26 while keeping a solenoid of the backward traveling switching valve 27 unexcited, whereby the clutch switching unit 13 is switched to the forward-traveling position. When the clutch lever 32B is set at the backward-traveling position (R), the controller 40 outputs a control signal, e.g., electric current, such as to excite the solenoid of the backward traveling switching valve 27 while keeping the solenoid of the forward traveling switching valve 26 unexcited, whereby the clutch switching unit 13 is switched to the backward-traveling position. When the clutch lever 32B is set at the neutral position (N), the controller 40 outputs a control signal, e.g., electric current, such as to keep both the solenoids of the forward traveling switching valve 26 and the backward traveling switching valve 27 unexcited, whereby the clutch switching unit 13 is switched to the neutral position.

When the clutch pedal 32A is depressed while the clutch lever 32B is positioned at the forward-traveling position (F) or the backward-traveling position (R), the controller 40 outputs a control signal, e.g., electric current, such as to unexcited the excited solenoid of either the forward traveling switching valve 26 or the backward traveling switching valve 27, whereby the clutch switching unit 13 is switched from either the forward-traveling position or the backward-traveling position to the neutral position.

Depending on whether the clutch switching unit 13 is set at the forward traveling position or the backward traveling position, either a forward traveling gear train or a backward traveling gear train is selected to drivingly connect the shuttle shaft 12 to the propulsion shaft 5a. A power of the propulsion shaft 5a is transmitted to the main speed-shifting device 5b and the sub speed-shifting device 5c, and a power output from the sub speed-shifting device 5c is transmitted to a rear wheel differential device 20R. The rear wheel differential device 20R rotatably supports rear axles 21R to which the rear wheels 7R are attached. That is, when the clutch switching unit 13 is switched to either the forward-traveling position or the backward-traveling position, the traveling clutch 5d is set in the engaged state to transmit a power to the traveling device 7 (that is, the front wheels 7F and the rear wheels 7R). In addition, when the clutch switching portion 13 is switched to the neutral position, the traveling clutch 5d is set in a disengaged state to isolate the traveling device 7 from the power from the prime mover 4.

The PTO power transmission portion 5e includes a PTO propulsion shaft 14 and a PTO clutch 15. The PTO propulsion shaft 14 is rotatably supported and configured to transmit a power from the propulsion shaft 5a. The PTO propulsion shaft 14 is drivingly connected to a PTO shaft 16 through gears or the like. The PTO clutch 15 includes a hydraulic clutch, for example. The hydraulic clutch serving as the PTO clutch 15 is selectively engaged or disengaged, so as to switch the PTO clutch 15 between an engaged state to transmit a power of the propulsion shaft 5a to the PTO propulsion shaft 14 and a disengaged state to isolate the PTO propulsion shaft 14 from the power of the propulsion shaft 5a.

As shown in FIG. 1, the tractor 1 includes braking devices. The braking devices include a left braking device 46a and a right braking device 46b. The left braking device 46a and the right braking device 46b include disk-type braking devices switchable between a braking state to perform a braking action and a brake-releasing state to release the braking action. The left braking device 46a is provided on the left rear axle 21R, and the right braking device 46b is provided on the right rear axle 21R. When the driver riding the tractor 1 operates (i.e., depresses) the brake pedal 31L shown in FIG. 2, a left coupling member 47a operably connected to the brake pedal 31L moves in a braking direction to set the left braking device 46a in the braking state. When the driver operates (i.e., depresses) the brake pedal 31R, a right coupling member 47b operably connected to the brake pedal 31R moves in a braking direction to set the right braking device 46b in the braking state.

A left hydraulic actuator 48a, which is actuated by hydraulic fluid, is operably connected to the left coupling member 47a. A left braking valve 49a is fluidly connected to the left hydraulic actuator 48a with a fluid line. By actuating the left hydraulic actuator 48a with the left braking valve 49a, the left coupling member 47a can be moved in the braking direction. In addition, a right hydraulic actuator 48b, which is actuated by the hydraulic fluid, is operably connected to the right coupling member 47b. A right braking valve 49b is fluidly connected to the right hydraulic actuator 48b with a fluid line. By actuating the right hydraulic actuator 48b with the right braking valve 49b, the right coupling member 47b can be moved in the braking direction.

As described above, in response to respective and independent operation of the brake pedal 31L and the brake pedal 31R, the left braking device 46a and the right braking device 46b can respectively and independently brake the left rear wheel 7R and the right rear wheel 7R.

As shown in FIG. 1, the tractor 1 includes the controller 40. The controller 40 performs various controls of the tractor 1. The controller 40 is electrically connected to a status detector 42. The status detector 42 includes a vehicle speed sensor 42a configured to detect a traveling direction of the tractor 1 (or the traveling device 7), a load sensor 42b configured to detect a load applied to the prime mover 4, a braking operation sensor 42c configured to detect operation extents of the braking operation members 31, i.e., the brake pedal 31L and the brake pedal 31R, a clutch lever sensor 42d configured to detect a position of the clutch lever 32B, and a clutch operation sensor 42e configured to detect an operation extent of the clutch pedal 32A. The status detector 42 need not include all of the above-mentioned sensors: the vehicle speed sensor 42a, the load detector sensor 42b, the braking operation detector sensor 42c, the clutch lever sensor 42d, and the clutch operation detector sensor 42e. In other words, the status detector 42 is not limited to the above-mentioned configuration, if only it includes sensors corresponding to a specification of the tractor 1.

The controller 40 includes a braking controller 40A. The braking controller 40A includes an electrical/electronic circuit installed in the controller 40, a computer program installed in the controller 40, or/and the like. A selector 45 is electrically connected to the controller 40, and is operable to determine whether or not the braking controller 40A is allowed to execute the braking action by the braking devices 46a and 46b. The selector 45 is a switch located around the driver seat 10, and is selectively set in either an ON state or an OFF state. When the selector 45 is set in on the ON state, the selector 45 issues a signal to the controller 40 so that the braking controller 40A is prepared to perform the brake action with the brake devices 46a and 46b. When the selector 45 is set in the OFF state, the selector 45 issues another signal to the controller 40 so that the braking controller 40A is not allowed to execute the braking action by the brake devices 46a and 46b.

When the selector 45 is set in the ON state and the braking operation sensor 42c detects depression of the brake pedal 31L as the braking operation, the braking controller 40A activates the left hydraulic actuator 48a to execute the braking action by the left braking device 46a. When the selector member 45 is set in the ON state and the brake operation sensor 42c detects depression of the brake pedal 31R as the braking operation, the braking controller 40A activates the right hydraulic actuator 48b to execute the braking action by the right braking device 46b. When the selector member 45 is set in the ON state and the braking operation sensor 42c detects depression of both the brake pedal 31L and brake pedal 31R, the braking controller 40A activates the left hydraulic actuator 48a and the right hydraulic actuator 48b to execute the braking action by the left braking device 46a and the right braking device 46b.

When the clutch lever sensor 42d detects that the clutch lever 32B has been switched to the forward-traveling position (F), the controller 40 excites the solenoid of the forward traveling switching valve 26 to switch the traveling clutch 5d to the forward-traveling position. When the clutch lever sensor 42d detects that the clutch lever 32B has been switched to the backward-traveling position (R), the controller 40 excites the solenoid of the backward traveling switching valve 27 to switch the traveling clutch 5d to the backward-traveling position. When the clutch lever sensor 42d detects that the clutch lever 32B has been switched to the neutral position (N), the controller 40 stops excitation of the solenoids of the forward traveling switching valve 26 and the backward traveling switching valve 27 to set the traveling clutch 5d in the disengaged state.

The controller 40 includes an automatic switching controller 40B. The automatic switching controller 40B includes an electric/electronic circuit installed in the controller 40, a computer program installed in the controller 40, or/and the like. The automatic switching controller 40B is configured or programmed to switch the traveling clutch 5d in response to the braking operation of the braking operation members 31, i.e., the brake pedal 31L and the brake pedal 31R, when the braking controller 40A is not allowed to execute the braking action, that is, when the selector 45 is set in the OFF state.

Specifically, when the traveling clutch 5d is set at the forward-traveling position and an operation extent of the braking operation member 31 (that is, the brake pedals 31L and 31R) detected by the braking operation detector sensor 42c is increased and becomes a first threshold or more, the automatic switching controller 40B outputs control signals to the forward traveling switching valve 26 and the backward traveling switching valve 27 such as to switch the traveling clutch 5d from the engaged state to the disengaged state. When the traveling clutch 5d is set at the forward-traveling position and the operation extent of the braking operation member 31 (i.e., the brake pedals 31L and 31R) is reduced and becomes less than the first threshold, the automatic switching controller 40B outputs control signals to the forward traveling switching valve 26 and the backward traveling switching valve 27 such as to switch the traveling clutch 5d from the disengaged state to the engaged state.

In other words, when the traveling clutch 5d is set for the forward-traveling and the brake pedals 31L and 31R are depressed until their operation extent reaches or exceeds the first threshold, the transmission of power to the traveling device 7 is cut off, so that the tractor 1 becomes uncapable of driving to travel forward. On the other hand, when the traveling clutch 5d is set at the forward-traveling position the brake pedal 31L and brake pedal 31R depressed to have their operation extent equal to or more than the first threshold are released to have their operation extent less than the first threshold, so that the tractor 1 drives to travel forward.

Figure 3:
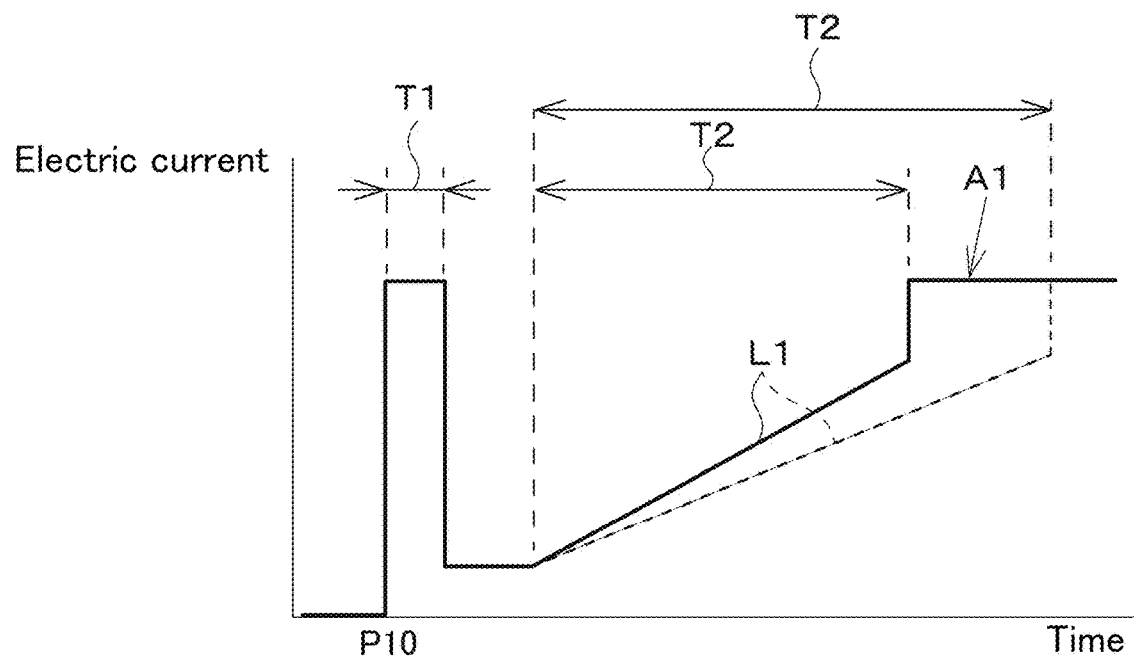
FIG. 3 is a view illustrating a control signal output to a forward traveling switching valve.

FIG. 3 shows the control signal output to the forward traveling switching valve 26 when the traveling clutch 5d is switched from the disengaged state to the engaged state by the automatic switching controller 40B.

As shown in FIG. 3, when the operation extent of the brake pedals 31L and 31R becomes less than the first threshold at a time P10, the automatic switching controller 40B instantaneously increases a current value A1 of the control signal to be output to the solenoid of the forward traveling switching valve 26 (in a one-shot section T1), then reduces the current value A1, and then gradually increases the current value A1 (in a modulation section T2). In the modulation section T2, in correspondence to a fore-and-aft movement (or an actual traveling) direction of the tractor 1, the automatic switching controller 40B changes the increasing rate of the current value A1 of the control signal (that is, a switching speed), that is, the automatic switching controller 4B changes an angle of a straight line L1 indicating the current value A1 of the control signal in the modulation section T2.

Specifically, the automatic switching controller 40B refers to a traveling direction of the tractor 1 (or the traveling device 7) at a point P10 when the operation extent of the brake pedals 31L and 31R becomes less than the first threshold. When the status detector 42 does not detect backward movement of the tractor 1 (or the traveling device 7) at the point P10, the automatic switching controller 40B sets the switching speed as a second speed indicated by a solid straight line L1. On the other hand, when the status detector 42 detects the tractor 1 (that is, the traveling device 7) as moving backward at the point P10, the automatic switching controller 40B sets the switching speed as a first speed indicated by a dotted straight line L1, thereby reducing the switching speed. That is, when the operation extent of the braking operation member 31 (i.e., the brake pedals 31L and 31R) is detected as being reduced and becoming less than the first threshold and the tractor 1 (the traveling device 7) is detected as moving backward, the automatic switching controller 40B sets the reduced switching speed (i.e., the first speed) less than the switching speed (i.e., the second speed) set when the operation extent of the braking operation member 31 (i.e., the brake pedals 31L and 31R) is detected as being reduced and becoming less than the first threshold and the tractor 1 (the traveling device 7) is not detected as moving backward.

In this regard, for example, while the tractor 1 (or the traveling device 7) is positioned on a slope, once a driver releases his/her feet from the brake pedal 31L and the brake pedal 31R and switches the traveling clutch 5d into the engaged state for forward traveling of the tractor 1 (or the traveling device 7), the tractor 1 (or the traveling device 7) may move backward to descend the slope. However, due to the above-mentioned configuration, the traveling clutch 5d is switched into the forward traveling state at the reduced switching speed, i.e., the first speed, so as to prevent the prime mover 4 from stalling.

When the reduced switching speed, i.e., the first speed, of the traveling clutch 5d is too slow under the state where the tractor 1 (that is, the traveling device 7) is positioned on a slope, the tractor 1 (or the traveling device 7) may move downwardly backward at a long distance. In consideration of the problem, the tractor 1 is configured so that a driver can set a distance or a time allowed for the downwardly backward movement of the tractor 1 (that is, the traveling device 7).

Figure 4:
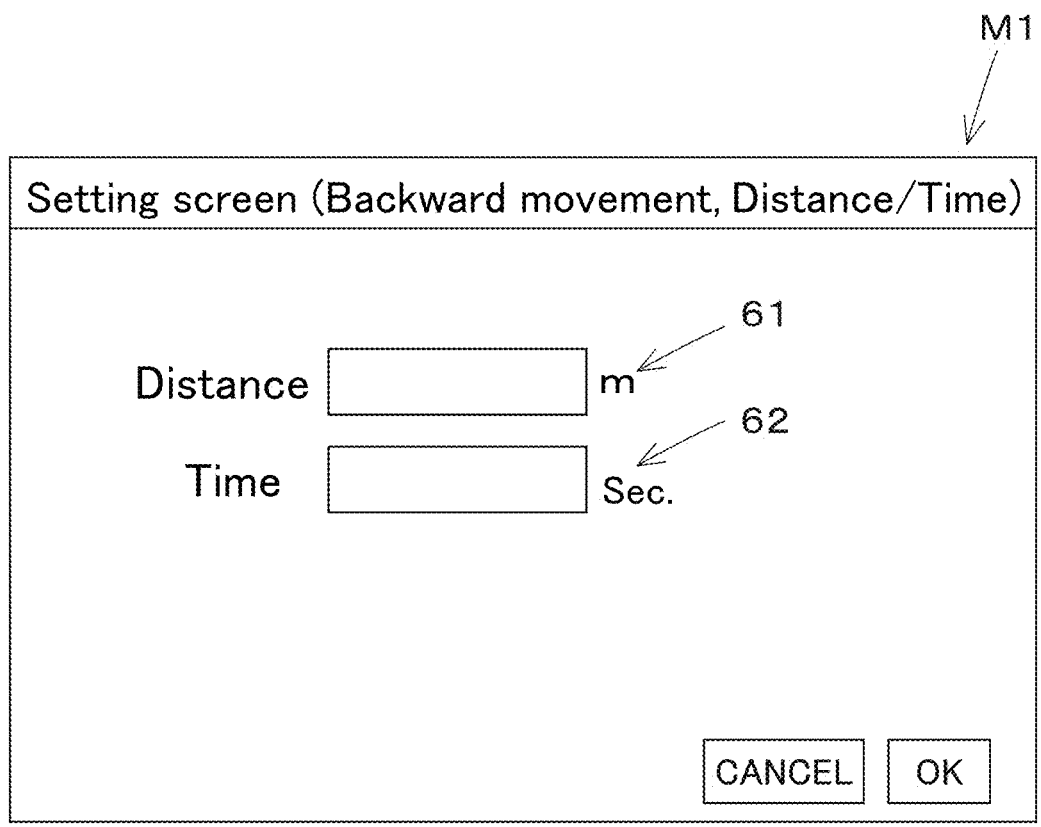
FIG. 4 is a view illustrating an example of a setting screen.

As shown in FIG. 1, the controller 40 includes a setting unit 40C. The setting unit 40C includes an electric/electronic circuit installed in the controller 40, a computer program installed in the controller 40, or/and the like. When a predetermined operation is performed on a display 50 located around the driver seat 10 of the tractor 1, the setting unit 40C displays a setting screen M1 on the display 50 as shown in FIG. 4. The setting screen M1 includes a distance input portion 61 to input an allowable distance for the backward movement (hereinafter simply referred to as an allowable distance) and a time input portion 62 to input an allowable time for the backward movement (hereinafter simply referred to as an allowable time). By operating a switch or the like operably connected to the display 50, a driver can input the allowable distance into the distance input portion 61, and the allowable time into the time input portion 62, respectively. The allowable distance and the allowable time are stored in the controller 40.

The setting screen M1 may display only either one of the distance input portion 61 and the distance input portion 62, so that the driver may input only either one of the allowable distance and the allowable time.

When the allowable distance is set, the automatic switching controller 40B monitors the backward-movement distance after the status detector 42 detects the backward movement. The backward-movement distance can be calculated based on a rotational speed of the axle detected by the vehicle speed sensor 42a, for example. The above-mentioned method of calculating the backward-movement distance is an example and is not limited thereto. In the state where the automatic switching controller 40B outputs, to the forward traveling switching valve 26, the control signal of the current value A1 corresponding to the dotted straight line L1 defining the modulation section T2, once the backward movement distance reaches the set allowable distance, the automatic switching controller 40B steeply increases the current value of the control signal to end the reduction of the switching speed (i.e., the setting of the first speed), that is, to end a switching speed reduction processing to reduce the switching speed to the first speed less than the second speed.

When the allowable time is set, the automatic switching controller 40B monitors the backward-movement time after the status detector 42 detects the backward-movement. The backward-movement time can be measured, by a time-counting unit (i.e., a timer) provided in the controller 40. The above-mentioned method of measuring the backward-movement time is an example, and is not limited thereto. In the state where the automatic switching controller 40B outputs, to the forward traveling switching valve 26, the control signal of the current value A1 corresponding to the dotted straight line L1 defining the modulation section T2, once the backward-movement time reaches the set allowable time, the automatic switching controller 40B steeply increases the current value of the control signal to end the reduction of the switching speed to the first speed, i.e., to end the switching speed reduction processing.

Accordingly, the switching speed reduction processing can be performed within the allowable distance or the allowable time intended by the driver.

In the above-described preferred embodiment, the switching speed of the traveling clutch 5d is changed based on monitoring of backward movement of the tractor 1 (or the traveling device 7). Alternatively, the switching speed of the traveling clutch 5d may be changed in correspondence to a load on the prime mover 4.

The automatic switching controller 40B changes the switching speed in correspondence to the load applied on the prime mover 4 when the operation extent of the braking operation member 31 (i.e., the brake pedals 31L and 31R) becomes less than the first threshold. Specifically, the automatic switching controller 40B refers to the load on the prime mover 4 of the tractor 1 (or the traveling device 7) at the point P10 when the operation extent of the brake pedals 31L and 31R becomes less than the first threshold. The load on the prime mover 4 can be detected by the status detector 42 (specifically, the load sensor 42*b*).

As shown in FIG. 3, when the load detected by the status detector 42 (specifically, the load sensor 42*b*) is less than a second threshold at the time P10, the automatic switching controller 40B sets the switching speed as the second speed indicated by the solid straight line L1. On the other hand, when the load detected by the status detector 42 (specifically, the load sensor 42*b*) is not less than the second threshold at the time P1, the automatic switching controller 40B sets the reduced switching speed as the first speed indicated by the dotted straight line L1. That is, when the operation extent of the braking operation member 31 (i.e., the brake pedals 31L and 31R) is reduced and becomes less than the first threshold and the load on the prime mover 4 is not less than the second threshold, the automatic switching controller 40B sets the reduced switching speed (i.e., the first speed) less than the switching speed (i.e., the second speed) set when the operation extent of the braking operation member 31 (i.e., the brake pedals 31L and 31R) is reduced and becomes less than the first threshold and the load on the prime mover 4 is less than the second threshold.

Therefore, for example, a case when the tractor 1 (or the traveling device 7) on a slope is operated to travel forward by operating the brake operation member 31 (i.e., the brake pedals 31L and 31R) and switching the traveling clutch 5*d* to the forward traveling position is assumed. In this case, if a high load that equals or exceeds the second threshold is applied on the prime mover 4, the switching speed of the traveling clutch 5*d* is reduced to the first speed to prevent the prime mover 4 from stalling. In the same case, if a low load that is less than the second threshold is applied on the prime mover 4, the stall of the prime mover 4 may hardly occur, and thus, by increasing the switching speed of the traveling clutch 5*d* to the second speed, the tractor 1 can quickly go up the slope.

The working vehicle 1 includes the prime mover 4, the traveling device 7, the traveling clutch 5*d* configured to be switched between the engaged state to transmit, to the traveling device 7, power provided from the prime mover 4 and the disengaged state to interrupt the power transmitting to the traveling device 7, the automatic switching controller 40B configured to switch the traveling clutch 5*d* from the disengaged state to the engaged state, and the status detector 42 configured to detect at least either a status of the prime mover 4 or a status of the traveling device 7. The automatic switching controller 40B changes the switching speed of the traveling clutch 5*d* switched from the disengaged state to the engaged state based on the status detected by the status detector 42. According to this configuration, the switching speed of the traveling clutch 5*d* switched from the disengaged state to the engaged state can be changed corresponding to a status of either the prime mover 4 or the traveling device 7, so that the switching speed of the traveling clutch 5*d* can be automatically increased or reduced based on a load of the prime mover 4, movement direction of the traveling device 7, or the like, for example. As the result, a force applied to the prime mover 4 in switching the traveling clutch 5*d* can be reduced, and thus the prime mover 4 can be prevented from stalling.

The working vehicle 1 includes the braking device configured to apply the braking action to the traveling device 7 in response to an operation of the braking operation member 31, the braking controller 40B configured to execute the braking action with the braking device in response to the operation of the braking operation member 31, and the selector 45 operable to select whether or not to allow the braking controller 40A to execute the braking action with the braking device. When the selector 45 is operated to determine not to allow the braking controller 40A to execute the braking action, the automatic switching controller 40B switches the traveling clutch 5*d* between the disengaged state and the engaged state in response to the operation of the braking operation member 31. According to this configuration, in a case where the braking controller 40A is not allowed to execute the braking action, the working vehicle 1 can be easily started through switching of the traveling clutch 5*d* by simply operating the braking operating member 31 from a state in which the working vehicle 1 is stopped. In this manner, while the working vehicle 1 is easily started through operating of the braking operation member 31, the switching speed of the traveling clutch 5*d* can be changed while monitoring a status of either the prime mover 4 or the traveling device 7, so that the engine stall can be prevented even in a case of repeated stopping and starting by the braking operation member 31.

The automatic switching controller 40B switches the traveling clutch 5*d* from the engaged state to the disengaged state when the operation extent of the braking operation member 31 is increased and becomes the first threshold or more, and switches the traveling clutch 5*d* from the disengaged state to the engaged state when the operation extent of the braking operation member 31 is reduced and becomes less than the first threshold. According to this configuration, when an operation extent of the braking operation member 31 is increased and becomes the first threshold or more, a power of the prime mover 4 can be prevented from being transmitted to the traveling device 7 by disengaging the traveling clutch 5*d*. When an operation extent of the braking operation member 31 is reduced and becomes less than the first threshold, a power of the prime mover 4 can be transmitted to the traveling device 7 to start the vehicle by engaging the traveling clutch 5*d*.

The status detector 42 is configured to detect whether or not the traveling device 7 moves in a certain direction. The automatic switching controller 40B changes the switching speed in correspondence to the movement of the traveling device in the certain direction detected when the operation extent of the braking operation member 31 is reduced and becomes less than the first threshold. According to this configuration, the engine stall can be prevented even in a state where the working vehicle 1 in starting moves in a different direction, for example.

The status detector 42 is configured to detect backward movement of the traveling device 7 defined as the movement of the traveling device 7 in the certain direction. When the operation extent of the braking operation member 31 is reduced and becomes less than the first threshold and the backward movement of the traveling device 7 is detected, the automatic switching controller 40B reduces the switching speed to a speed less than the switching speed set when the operation extent of the braking operation member 31 is reduced and becomes less than the first threshold and the backward movement of the traveling device 7 is not detected. According to this configuration, in a case where the working vehicle 1 starts (that is, starts to travel forward) from a stopping state on a slope, the engine stall can be prevented while allowing the traveling device 7 to move backward.

The status detector 42 is configured to detect a load on the prime mover 4. The automatic switching controller 40B changes the switching speed in correspondence to the load detected when the operation extent of the braking operation member 31 is reduced and becomes less than the first threshold. According to this configuration, since the switching speed is changed in correspondence to a load applied to the prime mover 4, the engine stalling can be surely prevented.

When the operation extent of the braking operation member is reduced and becomes less than the first threshold and the load is not less than a second threshold, the automatic switching controller 40B reduces the switching speed to the first speed less than the second speed that is the switching speed set when the operation extent of the braking operation member 31 is reduced and becomes less than the first threshold and the load is less than the second threshold. According to this configuration, when a load applied to the prime mover 4 is large, the switching speed is reduced to prevent the engine from stalling.

The working vehicle 1 includes the setting unit 40C configured to set a distance or time allowable for the backward movement of the traveling device 7. When an actual distance or time of backward movement of the traveling device 7 exceeds the set allowable distance or time, the automatic switching controller 40B stops the reduction of the switching speed. According to this configuration, even in a state where the vehicle moves backward when the traveling clutch 5d is switched, the setting unit 40C is operable to set the allowable distance or time such as to limit the backward movement of the vehicle with the traveling clutch 5d switched at the reduced switching speed, thereby surely preventing the engine stalling.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
   a prime mover;
   a traveling device;
   a traveling clutch switchable between an engaged state to transmit, to the traveling device, power provided from the prime mover and a disengaged state to interrupt the power transmitting to the traveling device;
   an automatic switching controller to switch the traveling clutch from the disengaged state to the engaged state;
   a status detector to detect at least either a status of the prime mover or a status of the traveling device; wherein the automatic switching controller is configured or programmed to change a switching speed of the traveling clutch switched from the disengaged state to the engaged state based on the status detected by the status detector;
   a brake to apply a braking action to the traveling device in response to an operation of a braking operator;
   a braking controller to execute the braking action with the brake in response to the operation of the braking operator; and
   a selector operable to select whether or not to allow the braking controller to execute the braking action with the brake; wherein
   when the selector is operated to determine not to allow the braking controller to execute the braking action, the automatic switching controller switches the traveling clutch between the disengaged state and the engaged state in response to the operation of the braking operator.

2. The working vehicle according to claim 1, wherein the automatic switching controller is configured or programmed to switch the traveling clutch from the engaged state to the disengaged state when an operation extent of the braking operator is increased and becomes a first threshold or more, and
   switches the traveling clutch from the disengaged state to the engaged state when the operation extent of the braking operator is reduced and becomes less than the first threshold.

3. The working vehicle according to claim 2, wherein
   the status detector is configured or programmed to detect whether or not the traveling device moves in a certain direction; and
   the automatic switching controller is configured or programmed to change the switching speed in correspondence to the movement of the traveling device in the certain direction detected when the operation extent of the braking operator is reduced and becomes less than the first threshold.

4. The working vehicle according to claim 3, wherein
   the status detector is configured or programmed to detect backward movement of the traveling device defined as the movement of the traveling device in the certain direction; and
   when the operation extent of the braking operator is reduced and becomes less than the first threshold and the backward movement of the traveling device is detected, the automatic switching controller is configured or programmed to reduce the switching speed to a speed less than the switching speed set when the operation extent of the braking operator is reduced and becomes less than the first threshold and the backward movement of the traveling device is not detected.

5. The working vehicle according to claim 2, wherein
   the status detector is configured or programmed to detect a load on the prime mover; and
   the automatic switching controller is configured or programmed to change the switching speed in correspondence to the load detected when the operation extent of the braking operator is reduced and becomes less than the first threshold.

6. The working vehicle according to claim 5, wherein when the operation extent of the braking operator is reduced and becomes less than the first threshold and the load is not less than a second threshold, the automatic switching controller is configured or programmed to reduce the switching speed to a speed less than the switching speed set when the operation extent of the braking operator is reduced and becomes less than the first threshold and the load is less than the second threshold.

7. The working vehicle according to claim 4, further comprising:
   a setting controller to set a distance or time allowable for backward movement of the traveling device; wherein
   when an actual distance or time of backward movement of the traveling device exceeds the set allowable distance or time, the automatic switching controller is configured or programmed to stop the reduction of the switching speed.

8. The working vehicle according to claim 2, further comprising:
   a forward traveling switching valve fluidly connected to a clutch switch including a hydraulic clutch and operable by a solenoid to switch the clutch switch into a state to allow forward traveling of the traveling device; and
   a backward traveling switching valve fluidly connected to the clutch switch and operable by another solenoid to switch the clutch switch into a state to allow backward traveling of the traveling device; wherein when the operation extent of the braking operator is reduced and becomes less than the first threshold, the automatic switching controller is configured or programmed to increase an electric current value of a control signal output to the solenoid of the forward traveling switching valve, then reduce the electric current value, and then increase the electric current value again.

9. The working vehicle according to claim 3, further comprising:

a forward traveling switching valve fluidly connected to a clutch switch including a hydraulic clutch and operable by a solenoid to switch the clutch switch into a state to allow forward traveling of the traveling device; and a backward traveling switching valve fluidly connected to the clutch switch and operable by another solenoid to switch the clutch switch into a state to allow backward traveling of the traveling device; wherein when the operation extent of the braking operator is reduced and becomes less than the first threshold, the automatic switching controller is configured or programmed to increase an electric current value of a control signal output to the solenoid of the forward traveling switching valve, then reduce the electric current value, and then increase the electric current value again.

10. The working vehicle according to claim 4, further comprising:

a forward traveling switching valve fluidly connected to a clutch switch including a hydraulic clutch and operable by a solenoid to switch the clutch switch into a state to allow forward traveling of the traveling device; and a backward traveling switching valve fluidly connected to the clutch switch and operable by another solenoid to switch the clutch switch into a state to allow backward traveling of the traveling device; wherein when the operation extent of the braking operator is reduced and becomes less than the first threshold, the automatic switching controller is configured or programmed to increase an electric current value of a control signal output to the solenoid of the forward traveling switching valve, then reduce the electric current value, and then increase the electric current value again.

11. The working vehicle according to claim 5, further comprising:

a forward traveling switching valve fluidly connected to a clutch switch including a hydraulic clutch and operable by a solenoid to switch the clutch switch into a state to allow forward traveling of the traveling device; and a backward traveling switching valve fluidly connected to the clutch switch and operable by another solenoid to switch the clutch switch into a state to allow backward traveling of the traveling device; wherein when the operation extent of the braking operator is reduced and becomes less than the first threshold, the automatic switching controller is configured or programmed to increase an electric current value of a control signal output to the solenoid of the forward traveling switching valve, then reduce the electric current value, and then increase the electric current value again.

12. The working vehicle according to claim 6, further comprising:

a forward traveling switching valve fluidly connected to a clutch switch including a hydraulic clutch and operable by a solenoid to switch the clutch switch into a state to allow forward traveling of the traveling device; and a backward traveling switching valve fluidly connected to the clutch switch and operable by another solenoid to switch the clutch switch into a state to allow backward traveling of the traveling device; wherein when the operation extent of the braking operator is reduced and becomes less than the first threshold, the automatic switching controller is configured or programmed to increase an electric current value of a control signal output to the solenoid of the forward traveling switching valve, then reduce the electric current value, and then increase the electric current value again.

13. The working vehicle according to claim 7, further comprising:

a forward traveling switching valve fluidly connected to a clutch switch including a hydraulic clutch and operable by a solenoid to switch the clutch switch into a state to allow forward traveling of the traveling device; and a backward traveling switching valve fluidly connected to the clutch switch and operable by another solenoid to switch the clutch switch into a state to allow backward traveling of the traveling device; wherein when the operation extent of the braking operator is reduced and becomes less than the first threshold, the automatic switching controller is configured or programmed to increase an electric current value of a control signal output to the solenoid of the forward traveling switching valve, then reduce the electric current value, and then increase the electric current value again.

14. The working vehicle according to claim 8, wherein when the operation extent of the braking operator is reduced and becomes less than the first threshold and the status detector does not detect backward movement of the traveling device, the automatic switching controller is configured or programmed to output a control signal with an electric current value to set the switching speed to a predetermined speed; and when the operation extent of the braking operator is reduced and becomes less than the first threshold and the status detector detects backward movement of the traveling device, the automatic switching controller is configured or programmed to output a control signal with an electric current value to reduce the switching speed to a speed less than the predetermined speed.

15. The working vehicle according to claim 14, wherein the automatic switching controller is configured or programmed to refer to the movement direction of the traveling device when the operation extent of the braking operator is reduced and becomes less than the first threshold.

16. The working vehicle according to claim 7, wherein the automatic switching controller, which has outputted the control signal with the electric current value corresponding to the reduced switching speed to the forward traveling switching valve because the operation extent of the braking operator is reduced and becomes less than the first threshold and the traveling device moves backward, is configured or programmed to increase the electric current value of the control signal to stop the reduction of the switching speed when a distance of the backward movement of the traveling device reaches the set allowable distance.

17. The working vehicle according to claim 7, wherein the automatic switching controller, which has outputted the control signal with the electric current value corresponding to the reduced switching speed to the forward traveling switching valve because the operation extent of the braking operator is reduced and becomes less than the first threshold and the traveling device moves backward, is configured or programmed to increase the electric current value of the control signal to stop the reduction of the switching speed when a time of the backward movement of the traveling device reaches the set allowable time.

18. The working vehicle according to claim 6, wherein
when the operation extent of the braking operator is reduced and becomes less than the first threshold and the load detected by the status detector is less than the second threshold, the automatic switching controller is configured or programmed to output electric current with a value to set the switching speed to a predetermined speed; and
when the operation extent of the braking operator is reduced and becomes less than the first threshold and the load detected by the status detector is not less than the second threshold, the automatic switching controller is configured or programmed to output electric current with another value to reduce the switching speed to a speed less than the predetermined speed.

19. The working vehicle according to claim 8, wherein
when the operation extent of the braking operator is reduced and becomes less than the first threshold and the load detected by the status detector is less than the second threshold, the automatic switching controller is configured or programmed to output electric current with a value to set the switching speed to a predetermined speed; and
when the operation extent of the braking operator is reduced and becomes less than the first threshold and the load detected by the status detector is not less than the second threshold, the automatic switching controller is configured or programmed to output electric current with another value to reduce the switching speed to a speed less than the predetermined speed.

* * * * *